United States Patent Office 2,830,045
Patented Apr. 8, 1958

2,830,045

NEW CARBOXYLIC ACID IMIDE AND A PROCESS FOR THE MANUFACTURE THEREOF

Ernst Leumann and Daniel Porret, Monthey, and Alberto Deflorin and Arthur Maeder, Basel, Switzerland, assignors to Ciba Limited, Basel, Switzerland, a Swiss firm No Drawing. Application May 16, 1957
Serial No. 659,493

Claims priority, application Switzerland May 25, 1956

2 Claims. (Cl. 260—239)

This invention provides as a new compound methacrylic acid ethylene imide of the formula $$CH_2=C-CO-N\diagdown \begin{matrix} CH_2 \\ | \\ CH_2 \end{matrix}$$
$$\phantom{CH_2=C-}|$$
$$\phantom{CH_2=}CH_3$$

The invention also provides a process for the manufacture of the above methacrylic acid ethylene imide, wherein a methacrylic acid halide, especially methacrylic acid chloride, is reacted with ethylene-imine.

The reaction is advantageously carried out in the presence of an organic solvent and an agent capable of binding hydrogen halide at a relatively low temperature, and advantageously within the range of approximately 0° C. to 30° C.

Suitable organic solvents are, for example, acetone, benzene and toluene. There may also be used a mixture of two or more solvents.

As an agent capable of binding hydrogen halide there is preferably used a tertiary amine, for example, pyridine, dimethyl-aniline or more especially triethylamine.

The process is advantageously carried out by adding the methacrylic acid halide in small portions to a mixture, cooled to about 5° C., of a solvent, ethyleneimine and a hydrogen halide acceptor, while stirring and cooling the mixture, removing the precipitated hydrohalide by filtration after the reaction, and distilling the filtrate under reduced pressure, if desired, after adding thereto a small proportion of a known polymerization inhibitor, such as hydroquinone.

Methacrylic acid ethylene imide is a clear stable liquid which boils at 49.5–50.5° C. under 12 mm. pressure. It can be polymerized by heating it with the usual polymerization catalysts.

The new compound is useful for various purposes both in the monomeric and polymeric form. It is especially useful for making polymerization resins or copolymerization resins. Thus, it can be used for making mouldable compositions and shaped products such as films, or adhesives, lacquers, or for the manufacture of impregnating or coating compositions for fibrous materials.

The following examples illustrate the invention, the parts and percentages being by weight unless otherwise stated, and the relationship of parts by weight to parts by volume being the same as that of the kilogram to the liter.

Example 1

143 parts of methacrylic acid chloride are added dropwise in the course of 1½ hours to a mixture, cooled to about 5° C., of 59 parts of ethylene-imine, 138 parts of triethylamine and 500 parts by volume of acetone, while stirring and cooling the mixture. During the addition the temperature of the reaction is maintained between 10 and 15° C. The mixture is then stirred for a further ½ hour at about 18–20° C., then the precipitated triethylamine hydrochloride is removed by filtration, washed with acetone, and the acetone is removed from the filtrate by distillation under reduced pressure after the addition of 0.2 to 0.3 part of hydroquinone.

By distilling the residual oil at a temperature of 49.5 to 50.5° C. under 12 mm. pressure pure monomeric methacrylic acid ethylene imide is obtained in the form of a clear stable liquid and in a yield of 76–78%.

Example 2

10 parts of methacrylic acid ethylene imide are dissolved in 90 parts of water and 0.05 part of potassium persulfate is added to the solution. On heating to about 50° C., polymerization soon occurs, a gel being formed which, after drying in vacuo and at elevated temperature, leaves a polymer behind which is insoluble in practically all solvents.

If this reaction is carried out on cotton, the material being impregnated with the above described aqueous solution and then dried and hardened for about 10 minutes at 120° C., there is obtained an impregnation which is fast to washing. The cotton treated in this manner has an improved dyeing affinity for acid wool dyestuffs.

Example 3

For the purpose of forming an addition polymer with amido- and thio-ether groups, 9.2 parts of thio-glycollic acid are added dropwise to a solution of 11.1 parts of methacrylic acid ethylene imide in 44.4 parts of tetrahydrofurane with cooling and in a nitrogen atmosphere. When addition is complete, the reaction mixture is gradually heated to the boil. After about half an hour the solvent is distilled off and the reaction product heated for 1 hour at 120° C. and 1 hour at 140° C.

A yellowish colored, rubber-like resin is obtained which is insoluble in most solvents, particularly in acetone or trichlorethylene. The new artificial resin is suitable for the manufacture of solvent-resistant objects and, if analogous resins of a lower stage of polymerization are used, can be used as an excellent solvent-resistant coating agent which is polymerized out by subsequent heating.

The polymer has probably the following constitution:

$$HS-CH_2-COO\!\!\left[\!-CH_2-CH_2-NH-CO-\underset{\underset{CH_3}{|}}{CH}-CH_2-S-CH_2-COO\!-\!\right]_{\!n}\!\!-CH_2-CH_2-NH-CO-\underset{\underset{CH_3}{|}}{C}\!=\!CH_2$$

Example 4

75 parts of an aqueous solution of glycocoll of 10% strength are mixed with 111 parts of an aqueous solution of methacrylic acid ethylene imide of 10% strength. After half an hour cotton is impregnated with this solution and dried at 90 to 100° C. The fabric treated in this manner is then heated for 15 minutes at 130° C.

The cotton finished in this way can be easily dyed with acid wool dyestuffs. The dressing is very fast to washing.

Example 5

If the operation for preparing an addition polymer is carried out as described in Example 3 and an equivalent quantity of 11-amino-undecanic acid is used for the reaction instead of thioglycollic acid, there is obtained a polyamide-like polymer containing basic groups in the form of a colorless viscous resin with fiber-forming properties.
What is claimed is:
1. Methacrylic acid ethylene imide of the formula
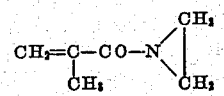
2. A process for the manufacture of methacrylic acid ethylene imide, which comprises reacting a methacrylic acid halide with ethylene imine.
No references cited.